United States Patent [19]

Marsh

[11] 4,049,391

[45] * Sept. 20, 1977

[54] PROCESS FOR REFUSE DISPOSAL AND HEAT RECOVERY THEREFROM

[75] Inventor: Paul G. Marsh, Hamilton, Ohio

[73] Assignee: Black Clawson Fibreclaim, Inc., New York, N.Y.

[*] Notice: The portion of the term of this patent subsequent to Jan. 30, 1990, has been disclaimed.

[21] Appl. No.: 685,784

[22] Filed: May 13, 1976

Related U.S. Application Data

[60] Continuation-in-part of Ser. No. 456,041, April 1, 1974, which is a division of Ser. No. 203,295, Nov. 30, 1971, Pat. No. 3,830,636, which is a continuation-in-part of Ser. No. 94,084, Dec. 1, 1970, Pat. No. 3,736,223, which is a continuation-in-part of Ser. No. 14,431, Feb. 26, 1970, abandoned, and a continuation-in-part of Ser. No. 99,554, Dec. 18, 1970, Pat. No. 3,714,038.

[51] Int. Cl.$^2$ .............................................. C10L 5/00
[52] U.S. Cl. ..................................... 44/10 R; 44/1 D
[58] Field of Search ...................... 44/10 R, 1 R, 1 D; 110/8 R

[56] References Cited

U.S. PATENT DOCUMENTS

| 3,506,414 | 4/1970 | Skendrovic | 44/10 R |
| 3,759,196 | 9/1973 | Spaite | 110/8 R |

*Primary Examiner*—Carl F. Dees
*Attorney, Agent, or Firm*—Biebel, French & Nauman

[57] ABSTRACT

Municipal refuse is treated to produce a particulate mixture consisting essentially of its organic constituents substantially free of inorganic materials, the particles in the mixture being of less than a predetermined maximum particle size, and the mixture also being characterized on a volumetric or weight unit basis by (a) substantial homogeneity of component materials, (b) substantial uniformity from the standpoint of distribution of particle sizes, (c) substantially uniform moisture content, and (d) substantially uniform fuel value. This mixture is then converted to compacted lump fuel, e.g. pellets, briquettes or cubes, by first drying to an appropriately low moisture content, e.g. 20% or less, a minor fraction of the pellets being recycled as the fuel for effecting the desired drying.

10 Claims, 1 Drawing Figure

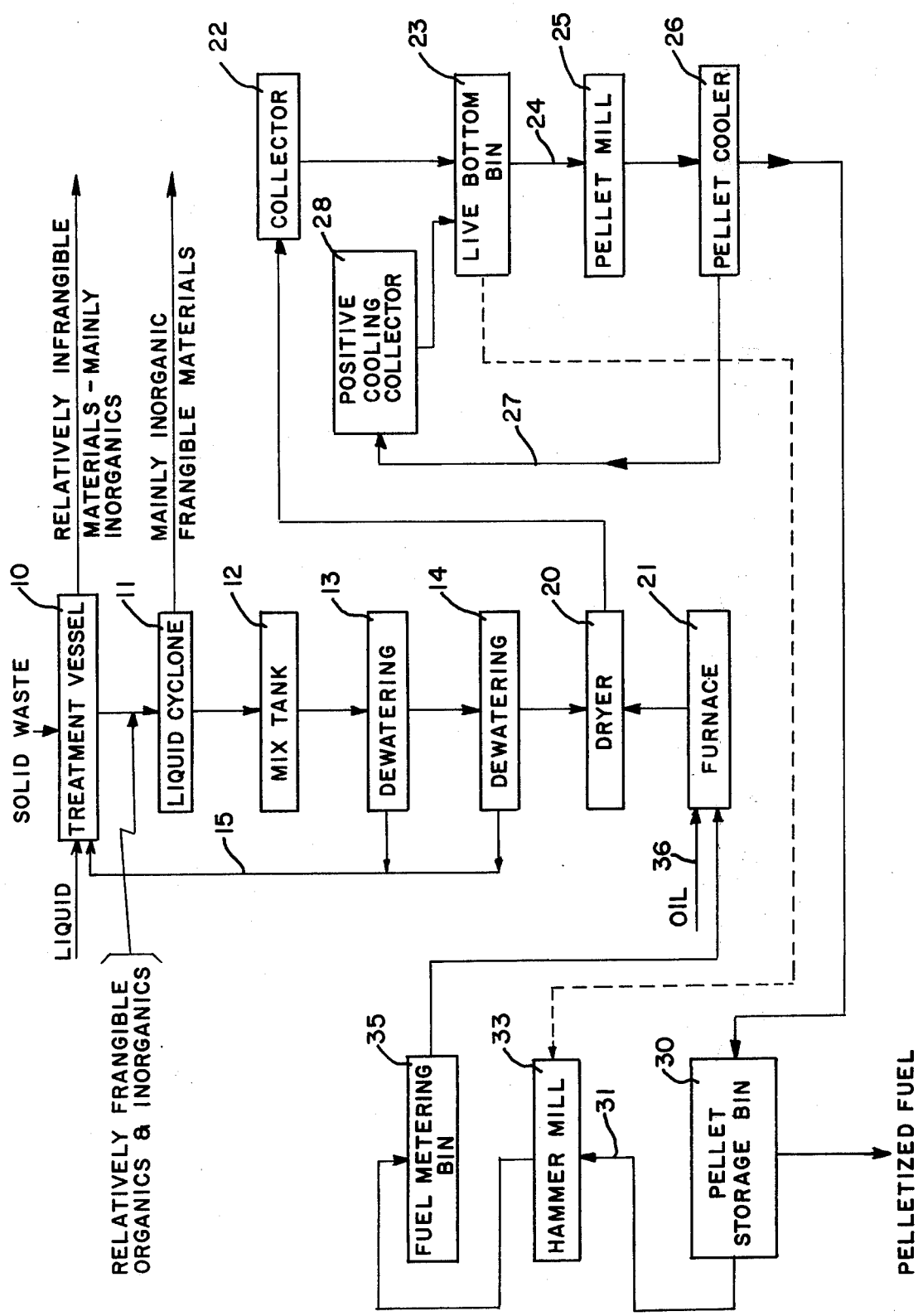

PROCESS FOR REFUSE DISPOSAL AND HEAT RECOVERY THEREFROM

CROSS REFERENCE TO RELATED APPLICATIONS

This application is a continuation-in-part of application Ser. No. 456,041, filed Apr. 1, 1974 as a division of application Ser. No. 203,295, (now U.S. Pat. No. 3,830,636) filed Nov. 30, 1971 as a continuation-in-part of application Ser. No. 94,084, filed Dec. 1, 1970, I now U.S. Pat. No. 3,736,223 issued May 29, 1973, which was a continuation-in-part of application Ser. No. 14,431 filed Feb. 26, 1970 and now abandoned, and also as a continuation-in-part of application Ser. No. 99,554 filed Dec. 18, 1970, now U.S. Pat. No. 3,714,038 issued Jan. 30, 1973. Specific reference is also made to my U.S. Pat. No. 3,549,011 and my patent with Earl T. Blakley U.S. Pat. No. 3,549,010, and Joseph Baxter, Jr. U.S. Pat. No. 3,549,092, all issued Dec. 2, 1970.

BACKGROUND OF THE INVENTION

Solid waste materials of the type typified by municipal waste have traditionally presented problems of disposal which have become increasingly critical in recent years as a result of not only a rapidly increasing population but the compounding difficulty of a drastic increase in per capita production of solid waste. Conventionally, such solid waste has been disposed of by such means as incineration and landfill. Obviously, with the ever increasing concern with problems of natural resources and the dwindling supply of acreage suitable for landfill operations within a reasonable distance of population centers both of these methods of solid waste disposal are becoming less acceptable.

At the same time that both population and the per capita production of refuse have been increasing, the national energy shortage has made it important to give full consideration to refuse as a potential source of energy. Based on recent (Spring 1973) figures from the National Center for Resource Recovery, municipal solid waste contains a total of about 50% organic matter, in accordance with the following table:

TABLE 1
COMPOSITION OF MUNICIPAL SOLID WASTE

| COMPONENT | DRY BASIS |
|---|---|
| Glass | 9.0% |
| Ferrous Metal | 7.0% |
| Aluminum | 0.7% |
| Other Nonferrous | 0.3% |
| Paper | 32.0% |
| Textiles | 1.8% |
| Rubber | 1.0% |
| Plastics | 1.5% |
| Other Organic | 13.7% |
| Other Inorganic | 8.0% |
| Water | 25.0% |
| TOTAL | 100.0% |

The organic fraction of municipal solid waste is an important source of energy, which has an average heat value of about 8500 l Btu per dry pound and an annual potential for the United States equivalent to nine billion gallons of No. 2 fuel oil. On a dry basis, its heat equivalent is about two-thirds that of Ohio coal, while its sulphur content is nil compared to low sulphur coal. Most important, it is a renewable source of energy which is readily available on a year-round basis in energy dependent urban areas.

In order to realize the potential of municipal refuse as fuel, it must be converted to a form of sufficiently uniform physical and combustion characteristics to suit the specific requirements of the furnace or other burner in which it is to be used. From this standpoint, it is essential that the inorganic constituents be removed as completely and efficiently as possible from the oganic fraction, so that all of the organic material can be processed to fuel while the ash content is minimized. A less obvious requirement is that there must also be complete separation of organic material from the removed inorganic fraction, since any organics retained with inorganics which ultimately reach land fill constitutute a putrescible nuisance and potential hazard.

Except for the present invention and my prior work disclosed in my above U.S. Pat. No. 3,830,636, attempts to produce solid waste fuel on a practical purpose have been primarily directed toward better separation techniques and reduction of particle size in dry treatment systems. This approach, however, is complicated by a number of factors. For example, solid waste is heterogeneous by nature, but it is subject to daily and seasonal variations in moisture content which can range from as low as 15% to more than 50%, resulting in variable heat content on any unit weight basis. For example, statistics on dry shredded fuel characteristics released in 1974 by Midwest Research Institute show an organic content ranging from 24.5% to 66.9% with an average of 55.3%, an ash content ranging from 7.6% to 19.5% and an average of 14.8%, and a water content ranging from 14.3% to 66.3% with an average of 29.9%. The Btu value ranged from 2293 to 6446 per pound and averaged 5086.

Most recent attempts to improve solid waste fuel by a dry process approach have utilized combinations of shredding apparatus with air classification to provide a fuel for immediate or near term firing on or near the site. The loose bulk density of solid waste fuel produced in this manner may have a range as wide as 5–12 pounds per cubic feet on an oven dry basis, as compared to 50–55 pounds for coal. The resulting bulk of dry solid waste fuel makes it uneconomical to transport any significant distance or to store in any substantial quantity; storage is further complicated by its tendency to deteriorate rapidly under favorable storage conditions and because such fuel cannot be exposed to weather.

SUMMARY OF THE INVENTION

The patents and applications listed above describe methods and systems for treating municipal refuse, not only in preparation for ultimate disposal, but also for processing in such manner as to recover various other materials of sufficiently high quality that their recovery is both economically and commercially attractive, typical such recovered components being metals, glass and paper making fiber.

U.S. Pat. No. 3,830,636, and the division thereof of which the present application is a continuation-in-part, disclose the recovery for reuse of the organic residue from which the inorganic materials have been removed, with special emphasis on the use of the organic residue as a fuel.

All of the above listed patents and applications relate to the treatment of municipal refuse by a wet process wherein the "as is" municipal refuse, unsorted except for elimination of such heavy items as stoves, refrigerators and bedsprings, is treated by a wet pulping process by which it is reduced to a slurry of about 4–6% solids.

This slurry is treated in a variety of ways to remove its several organic constituents, and sometimes to recover the best of the paper making fibers.

U.S. Pat. No. 3,830,636 disclosed the conversion of the organic residue, whether or not some paper fiber had been recovered, to a fuel, primarily by removal of sufficient liquid, e.g. to a solids content of the order of 50%. The resulting fuel can be used in conventional steam boilers, but primarily because of its bulk density, some modification of conventional fossil fuel conveying and firing equipment is desirable, particularly if the refuse fuel is used without supplementation by fossil fuel.

It is a primary object of this invention to produce a fuel from municipal waste which has physical characteristics sufficiently like those of fossil fuels for ready use as a substitute for fossil fuel, particularly in steam boiler furnaces and the like. Since solid waste organics have a value and an ash closer to those of coal than other fossil fuels, a particular object of the invention is to produce solid waste fuel which will as nearly as possible duplicate the properties of coal.

The invention is derived in part from recognition of the fact that the organic residue prepared by the wet process summarized above, considered on any volumetric or weight unit basis, will possess a high degree of uniformity in five respects, all of which are of importance in a fuel:

a. Substantial homogeneity of component materials.
b. Substantial uniformity of distribution of particle size.
c. An easily controllable maximum particle size.
d. Substantially uniform moisture content.
e. Substantially uniform fuel value.

These characteristics combine to contribute very important practical advantages for fuel purposes to the organic residue with which the present invention is concerned. In particular, they effectively eliminate the wide variations in composition and properties, on a unit basis, of the residue of refuse derived from a dry process. In addition, it has been established in accordance with the invention that the same properties provide a high degree of practicability to conversion of this organic residue into lump fuel, i.e. pellets, briquettes or cubes, which can be readily and successfully used in essentially the same manner, and for the same purposes, as lump coal, and which compare favorably with coal on a bulk density basis, i.e. 30 to 40 pounds per cubic foot for pellets roughly three-eights inch in diameter by 1 inch in length.

In developing this inventive concept, it has been established that conventional compacting equipment, such as is used in the agricultural and chemical processing industries, can be used for compacting solid waste organic products as summarized above into lump fuel. The successful application of such equipment for the purposes of the invention requires only that the raw material be dried to a sufficiently lower moisture content than is practically obtainable by mechanical pressing, e.g. not more than approximately 30% and preferably 10–15%, and drying also enhances the calorific value of the material for the same unit of weight.

To increase the efficiency of the practice of the invention, while also minimizing its dependance on other energy sources, it has been found highly effective to recycle a fraction of the dried material, e.g. approximately 15%, for use as fuel for the dryer wherein the previously compressed refuse material is reduced in moisture content from approximately 50% to the desired lower value for pelletizing. Thus the process of the invention is practically self-sustaining as well as highly efficient, as is demonstrated by the following table, which lists the several sources of energy input to a system in accordance with the invention for handling 750 tons per day of raw municipal refuse to produce a gross energy output calculated at $282.0 \times 10^6$ Btu per hour.

Table 2

| Energy Input at $10^6$ Btu/Hr. | |
|---|---|
| Electrical | |
|     Pulping | 19.4 |
|     Fuel Preparation | 11.1 |
| Diesel Fuel for Loader | 0.2 |
| Recycled Pellets | 44.3 |
| Fuel Oil | |
|     Building Heat | 0.8 |
|     Auxiliary Dryer Fuel | 1.1 |
| TOTAL | 75.9 |

It will be seen that on the basis of these figures, the net output of salable pellets may be stated as $206.1 \times 10^6$ Btu per hour, or 73.2%, computed by subtracting the total energy input from the gross energy output at 750 T/D.

Applicant is aware of recent work directed to the production of fuel pellets by dry processing municipal refuse, and the following table compares the properties of the two types of pellets:

Table 3

| | Wet Process | Dry Process |
|---|---|---|
| Ash (Bone Dry Basis) | 12% | 21% |
| Btu per pound (Bone Dry Basis) | 8200 | 7300 |
| Btu yield as recovered organics per ton of refuse | $9.0 \times 10^6$ | $6.9 \times 10^6$ |
| Energy yield as pellet | $6.6 \times 10^6$ | $5.6 \times 10^6$ |
| Btu loss to land fill | trace | $2.0 \times 10^6$ |

The last line in Table 3 is particularly significant in demonstrating the superiority of the present invention over dry process to produce lump fuel in that the invention results in virtually complete recovery of combustibles from the refuse while the dry process loses more than 20% of the organics which remain with the specific gravity materials. The reason is that the air classification which provide the most practical dry separation will reject large amounts of organic material, particularly if this material has a high moisture content. If the system is adjusted to accept such organic material, it will then accept an undue amount of inorganic "grit" and the like which increases the ash content of the fuel and also tends to damage the pelletizing accepted. On the other hand, the recycled organics constitute putrescible matter sent to land fill. The end result is that the capital cost of the total system and process are significantly less advantageous as compared with the present invention.

Among other advantages of the invention over dry processing, in addition to maximum yield of organic material as just noted, is the efficient removal of the maximum amount of "grit" particles or hard particles which would merely increase the weight of the pellets and would also tend to damage the processing equipment, especially the pellet mill. This advantage is demonstrated by comparison of the percentages of ash in Table 3, because true ash resulting from combustion of organics is approximately 8% for either type of pellet.

The balance represents non-combustible gritty materials, which total only 4% for the pellets of the invention as against 15% for dry processed pellets.

The uniformity and homogeneity on any volumetric or weight unit basis noted above are especially important in several ways as compared with the product of dry processing. For example, the invention eliminates slugs of plastic, etc., which give non-uniform chemical composition and moisture characteristics to dry processed pellets, and the uniformity of moisture promotes pellets of uniform characteristics such that they hold their shape properly in normal handling and usage. In comparison, pellets produced by dry processing are physically unstable, one major cause being the lack of complete defibering of the paper content, which prevents the constituents of the pellets from knitting together. Mention should also be made of the fact that the uniformity of applicant's material through the various stages of processing after pulping promotes uniform operating conditions and process control which are not obtainable in dry processing due to the heterogeneous nature of the matter in process.

BRIEF DESCRIPTION OF THE DRAWING

The single FIGURE shows process steps involved in producing lump fuel in accordance with the present invention in the form of pellets.

DESCRIPTION OF THE PREFERRED EMBODIMENT

For purposes of illustration, the present invention will be described in conjunction with the treatment of municipal refuse having the general range of component materials listed in Table I. This heterogeneous material is deposited in a treatment vessel 10 with sufficient water to dilute it to a pulpable consistency and subjected to mechanical and hydraulic shear forces of sufficient intensity to reduce the relative frangibility portions of the refuse to a pulpable consistency. U.S. Pat. No. 3,595,488, of which I am a co-inventor, shows a pulper particularly suited for this purpose and from which the reduced frangible portions of the solid waste may be continuously extracted for further treatment.

With this type of treatment vessel, relatively infrangible materials, mainly consisting of inorganics such as metals, are readily withdrawn separately from the slurry, by a junk remover as shown in Baxter U.S. Pat. No. 3,599,092, for disposal through salvage or other appropriate methods. The frangible materials, on the other hand, are reduced to a maximum particle size determined by the hole sizes in the perforated extraction plate with which the vessel is equipped, and preferred results for the purposes of this invention have been obtained with circular holes 1 inch in diameter.

The slurry of relatively frangible materials, extracted from the treatment vessel at 3% to 6%, includes both organic and inorganic components, and is then readily separated centrifugally by a liquid cyclone 11 or similar apparatus into a primarily organic fraction and a primarily inorganic fraction. The inorganic fraction, which consists mainly of aluminum and glass, may be subjected to separate salvage operations for recovery of the valuable components thereof or other disposition. The invention is concerned with the organic materials in the accepts fraction from the liquid cyclone, which typically includes approximately 65% of the original solid component materials of the refuse, with paper fibers constituting about two-thirds of the total.

This organic fraction will be in highly dilute condition when it leaves the liquid cyclone, e.g. 2.6% solids, and it is desirable to collect it in a mix or surge tank 12 of relatively large capacity, at least 30,000 gallons and advantageously 100 to 200 gallons, to provide for effective homogeneity of the slurry by averaging of the organic residue of the refuse delivered to the treatment vessel 10.

If it is desired to recover any of the paper fiber, as described in my above U.S. Pat. Nos. 3,736,223 and 3,830,636, this may be done at a screening station connected between the cyclone 11 and tank 12, but if the primary purpose of the system is to produce lump fuel, it is more practical to retain all of the fiber. The next step in the process is therefore one of dewatering, which is represented as being done in stations 13 and 14 consisting of apparatus for mechanically dewatering as much as is practicable by a pressing operation, for example in a screw press 13 followed by a cone press 14, and the liquid is recycled to the pulper, as indicated by the line 15.

It is not practically feasible to dewater the slurry mechanically to a higher solids content than about 50%. The resulting dewatered particulate mixture will possess all of the characteristics of uniformity outlined above, and as already indicated, the maximum particle size will have been determined by the size of the holes in the extraction plate from the treatment vessel. Tests show that the largest particles will ordinarily be pieces of plastic sheeting which may be as large as a couple of inches square but which were able to pass through 1-inch holes because they were rolled or wadded sufficiently to do so.

For optimum pelletizing in accordance with the invention, it is necessary to reduce the moisture content of the particulate mixture discharged from cone press 14 to a moisture content in the range of 10-20%. This is readily accomplished at a drying station 20, which may comprise a rotary dryer of a type conventionally used for agricultural products and incorporating a furnace 21. The output of the dryer 20 is discharged to a collector 22, preferably of a conventional cyclone type capable of separating the dried refuse material from the products of combustion.

The dried material is delivered a bin 23 from which it is transported by suitable conveyor apparatus, represented by the arrow 24, to a pellet mill 25, which may be of any conventional type employed to produce pellets of conventional size by the application of molding pressure and heat. The output of pellets goes to a pellet cooler 26 from which any fines entrained with the cooling air are recycled by way of a line 27 and second collector 28 to the bin 23. It is to be understood that pellets are merely one of the suitable forms of lump fuel which can be readily produced in accordance with the invention with the aid of conventional apparatus for producing pellets of other material, e.g. agricultural products as cattle food.

The output of finished pellets from the cooler 26 goes to a storage bin 30, from which a minor fraction, e.g. 15%, is recycled for use as fuel for the dryer furnace, as indicated by line 31. If the furnace incorporates a suspension type burner, as has been found very suitable, the pellets to be used therein are first pulverized by means 33 such as a hammer mill and then delivered to the furnace by way of a suitable fuel metering bin 35. Alternatively, dried material from the bin 23 may be diverted to the hammer mill 33 for fluffing in preparation for delivery to the furnace, as indicated by the line 36. A minor amount of fuel oil may be mixed with the refuse fuel, as indicated at 37, particularly for start up purposes. If the furnace 21 incorporates a grate type burner, the pellets may be burned there directly without pulverizing.

Practice of the invention as just described in connection with the drawing provides for highly efficient processing of municipal refuse into lump fuel of the maximum available Btu properties, and the figures given above in the various tables are based on pellets produced in the described manner. The advantages of the invention should therefore be apparent, particularly as compared with dry processes, which are not capable either of producing the same degree of fine particle sizes in the combustible material for fabricating pellets of uniform physical properties, of the accomplishing the effective elimination of non-combustibles for minimum ash content, or of achieving sufficient physical and chemical homogeneity for uniform fuel properties in the pellets.

While the process and product herein described constitute preferred embodiments of the invention, it is to be understood that the invention is not limited to this precise process and product, and that changes may be made therein without departing from the scope of the invention.

What is claimed is:

1. A process for producing lump fuel from refuse which comprises,
   a. adding water to refuse to form a pulpable mixture,
   b. pulping said mixture to disintegrate the refuse,
   c. extracting from the pulped refuse a slurry containing combustible particles having predetermined dimensions,
   d. separating non-combustible particles from said extracted slurry,
   e. concentrating said slurry by removal of water therefrom to form a concentrate of said combustible particles, and
   f. forming said concentrate into lumps.

2. The process of claim 1 wherein said concentrate has a moisture content of less than approximately 20% by weight.

3. The process of claim 1 wherein said particles are of a mesh size no greater than about 1 inch.

4. The process as defined in claim 1 wherein said concentrating step is carried out in two stages, the first said stage being a pressing operation, and the second said stage being a heating operation to dry the product of said pressing operation.

5. The process as defined in claim 4 further characterized in that said pressing operation is controlled to reduce the moisture content of said slurry to the order of 50%, and said heating operation is controlled to reduce the moisture content of said pressed concentrate to less than 30%.

6. A process for converting municipal solid waste into lump fuel which has the following characteristics on a weight unit basis:
   i. substantial homogeneity of component materials,
   ii. substantial uniformity of distribution of particle sizes,
   iii. substantially uniform moisture content,
   iv. substantially uniform fuel value, and
   v. substantially uniform ash content of less than approximately 12%,
comprising of:
   a. depositing municipal solid waste, including relatively frangible and infrangible organic and inorganic solids, in a treatment vessel together with a liquid medium in sufficient volume to establish a solids content of the order of 3 1 to 6 percent,
   b. subjecting said solids in the presence of said liquid medium in said treatment vessel to mechanical and hydraulic forces of sufficient intensity to reduce said relatively frangible organic and inorganic solids to particles of a predetermined maximum size forming a mixture with said liquid medium,
   c. removing from said treatment vessel in slurry form a portion of said liquid medium and such of said organic and inorganic particles as pass through perforations of the order of one inch in diameter,
   d. removing said relatively infrangible solids from said treatment vessel separately from said slurry,
   e. removing from said slurry the inorganic constituents thereof,
   f. accumulating a substantial volume of the resulting slurry to assure the homogeneity thereof,
   g. removing from the resulting slurry of said organic solids and liquid medium a sufficient portion of said liquid medium to convert said slurry to a pelletizable consistency, and
   h. forming the resulting converted slurry into lumps.

7. A process for producing lump fuel from refuse which comprises,
   a. adding water to refuse in a pulper to form a pulpable mixture,
   b. pulping said mixture in said pulper to disintegrate the refuse and to remove non-friable materials,
   c. extracting from the pulped refuse a pumpable slurry containing principally of fibrous combustible particles having mesh sizes no greater than about 1 inch and a minor portion of non-combustible particles,
   d. substantially eliminating non-combustible particles from said extracted slurry,
   e. concentrating said slurry by the removal of water therefrom to form a concentrate of said combustible particles having a moisture content of not more than about 20%, and
   f. forming said concentrate into lumps,
   g. said lumps having a compositional consistency of moisture, volatile, fixed carbon and ash to provide a consistent heat value.

8. As a new product, lump fuel consisting essentially of organic constituents of municipal refuse substantially free of inorganic materials, and prepared by a process comprising the steps of:
   1. depositing solid waste materials including relatively frangible and infrangible organic and inorganic solids and a liquid medium in a treatment vessel,
   2. subjecting said solids in the presence of said liquid medium in said treatment vessel to forces of sufficient intensity to reduce said relatively frangible organic and inorganic solids to particles of less than a predetermined maximum size forming a mixture with said liquid medium,
   3. extracting from said treatment vessel in slurry form a portion of said liquid medium and such of said organic and inorganic particles as pass through perforations sized to pass only particles of less than said predetermined maximum size,
   4. removing said relatively infrangible solids from said treatment vessel separately from said slurry, 5. removing from said extracted slurry the inorganic constituents thereof,
6. accumulating a substantial volume of the resulting slurry of said organic solids and liquid medium to assure the homogeneity thereof,
7. removing from said accumulated slurry a sufficient portion of said liquid medium to reduce the moisture content of the resulting particulate mixture to not more than approximately 20%,
8. forming said particulate mixture into lumps having the following characteristics on a weight unit basis:
a. substantial homogeneity of component materials,
b. substantial uniformity of distribution of particle sizes,
c. substantially uniform moisture content,
d. substantially uniform fuel value, and
e. substantially uniform ash content of less than approximately 12%.

9. The product defined in claim 8 wherein all of said particles are sufficiently small to pass through a screen member having circular openings not greater than one inch in diameter.

10. The product defined in claim 8 wherein said uniform moisture content comprises 10–20% of said mixture.

* * * * *

UNITED STATES PATENT AND TRADEMARK OFFICE
CERTIFICATE OF CORRECTION

PATENT NO. : 4,049,391
DATED : September 20, 1977
INVENTOR(S) : Paul G. Marsh

It is certified that error appears in the above-identified patent and that said Letters Patent are hereby corrected as shown below:

Column 1, line 12, before "now" delete the mark "1".

Column 1, line 61, between "8500" and "Btu" delete the mark "1".

Column 2, line 7, "oganic" should be --organic--.

Column 8, line 5, after "3" and before "to" delete the mark "1".

Signed and Sealed this

Third Day of January 1978

[SEAL]

Attest:

RUTH C. MASON
Attesting Officer

LUTRELLE F. PARKER
Acting Commissioner of Patents and Trademarks